UNITED STATES PATENT OFFICE.

ALFRED A. WELLS, OF MONTCLAIR, NEW JERSEY, ASSIGNOR, BY MESNE ASSIGNMENTS, TO NATIONAL CARBON COMPANY, INC., OF NEW YORK, N. Y., A CORPORATION OF NEW YORK.

PREPARING MANGANESE-CONTAINING BODIES.

1,412,986. Specification of Letters Patent. Patented Apr. 18, 1922.

No Drawing. Application filed October 27, 1917. Serial No. 198,865.

*To all whom it may concern:*

Be it known that I, ALFRED A. WELLS, a citizen of the United States, and a resident of Montclair, in the county of Essex and State of New Jersey, have invented certain new and useful Improvements in Preparing Manganese-Containing Bodies, of which the following is a specification.

This invention relates to the production of manganese salts from spent depolarizing agents, especially the manganese dioxide depolarizer of worn out dry batteries of the Leclanché type and the process embraces the production of various salts of manganese such as the carbonate, sulphate, chloride, and the like.

It frequently happens that the depolarizer in a dry battery is very largely in an unchanged condition, the deterioration of the battery being due to the presence of an insoluble compound of zinc which forms in and around the paper lining employed in dry batteries of the large or standard type and in and around the cloth bag frequently employed in cells of the miniature type. The zinc compound is evidently produced by the action of ammonia on zinc chloride present with electrolyte, and may be some sort of a basic compound of zinc chloride, or perhaps an ammonia addition product. Usually this compound is found in greatest amount just within the paper lining in the outer layers of the depolarizing agent forming a cement which causes the outer layers of depolarizer to adhere firmly to the paper when the spent battery is taken apart. The formation of the insoluble compound in this manner prevents the ready passage of the electric current hence the voltage and amperage of the cell drops to a negligible quantity and the cell is discarded.

In such cells the amount of depolarizing material actually "consumed" (reduced to a lower oxide in reacting with hydrogen) may amount to perhaps only ten or fifteen per cent. A battery mix may be removed from the spent batteries, washed with water and dried, thus removing the zinc chloride, ammonium chloride, and any other soluble salts which may be present. Usually little or no manganese salts go into solution. The mix, after washing with water, may be used in making new batteries, but it is usually preferable to supplement the water-extraction by an extraction with very dilute hydrochloric acid. The ammonium and zinc compounds extracted by water may be concentrated for use in preparing fresh electrolyte. The insoluble zinc compounds above referred to will be dissolved by the dilute hydrochloric acid and the solution so obtained may be worked for its values.

When extraction with very dilute hydrochloric acid is employed, the insoluble residue consists essentially of a mixture of graphite and manganese dioxide with lower oxides of manganese. This mixture may be used without further treatment in making up fresh cells, or it may be treated by any of the methods hereafter described to utilize its manganese content.

In case the manganese is to be again worked up into a depolarizing agent for dry batteries, it is desirable to remove iron as far as possible, as the presence of the latter is liable to bring about local action and deterioration upon standing.

One part of this depolarizing material may be mixed with two parts of powdered sodium acid sulphate or bisulphate of soda and the mixture heated until the mass frits, when the product is broken up, powdered, and extracted with hot water. The solution of manganese sulphate obtained contains various impurities, particularly iron. A small amount of sodium carbonate is added which throws down the major portion of the iron or similar impurities. The solution is boiled for a short time and filtered and the iron thus eliminated. The manganese in the filtrate may be precipitated with sodium carbonate, washed and dried, giving the carbonate of manganese.

Or the depolarizer taken from the worn out dry cell may be washed with water and dried as indicated above and then digested with hydrochloric acid and filtered. In this way the graphite is recovered in the insoluble residue. The filtrate is preferably boiled for a short time to remove chlorine and excess hydrochloric acid and may then be diluted considerably. A portion of the solution is then taken out, a solution of sodium carbonate added thereto to precipitate manganese and iron. The precipitate, if desired, may be washed with hot water and it is then returned to the bulk of the solution and the latter boiled for a time, The iron compound in solution and the manganese in the form of carbonate exchange places, carbon dioxide being given off and the iron being precipitated as the hydrate. The solution obtained is practically free from iron. This is filtered, the filtrate evaporated and manganese chloride crystallized out.

In like manner manganese sulphate may be obtained by treating the washed and dried spent depolarizer with sulphuric acid. To this end, 66° sulphuric acid is added to the depolarizer until the latter is moistened with this liquid and the mixture is heated gradually to redness. The mass is then ground and extracted with hot water. The water extract is heated to boiling and filtered to remove a small amount of iron which precipitates. The solution is then evaporated and the manganese sulphate crystallized. Or, if desired, the solution may be treated with an oxidizing agent to produce hyrated manganese dioxide.

What I claim is:—

1. The step in the process of purifying depolarizer from used dry batteries, which comprises separating insoluble zinc compounds from the depolarizing mass.

2. The step in the process of making manganese carbonate from the depolarizer of spent dry batteries, which comprises washing the spent battery mix with a suitable washing fluid to remove zinc compounds.

3. The step of purifying depolarizer from spent dry batteries of the Leclanché type which consists in leaching the depolarizing mass with dilute acid.

4. In the purification of depolarizer from spent dry batteries of the Leclanché type, the step which comprises substantially freeing the depolarizing mass from bodies deposited therein during the life period of the battery by removing precipitated matter from the depolarizing mass.

5. The process of making a manganese salt from spent depolarizer from dry batteries which comprises dissolving the depolarizer in acid and removing iron impurities by treatment with an alkali.

6. The process of making a manganese salt from spent depolorizer from dry batteries which comprises dissolving the depolarizer in acid and removing iron impurities by treatment with sodium carbonate.

7. The step in the process of making manganese compounds which comprises heating spent battery depolarizer with sulfuric acid material to form manganese sulfate and precipitating iron impurities from the mixture of compounds so obtained.

8. The process of making manganese compounds which comprises washing spent battery depolarizer with water, heating with sulfuric acid material to form manganese sulfate, dissolving the manganese sulfate, adding a small amount of sodium carbonate and digesting to throw out iron compounds.

9. The process of making manganese carbonate which comprises washing spent battery depolarizer with water, heating with sulfuric acid material to form manganese sulfate, dissolving the manganese sulfate, adding a small amount of sodium carbonate, digesting to throw out iron compounds, and filtering and precipitating the manganese as manganese carbonate by the addition of sodium carbonate.

ALFRED A. WELLS.